Patented Oct. 8, 1940

2,217,013

UNITED STATES PATENT OFFICE 2,217,013

CONVERSION OF DIOLEFIN HYDROCARBONS TO AROMATIC HYDROCARBONS

Aristid V. Grosse and William J. Mattox, Chicago, Ill., assignors to Universal Oil Products Company, Chicago, Ill., a corporation of Delaware No Drawing. Application May 31, 1938,
Serial No. 211,022

6 Claims. (Cl. 260—668)

This invention relates more particularly to the conversion of straight chain hydrocarbons into closed chain cyclic hydrocarbons.

More specifically it is concerned with a process involving the use of special catalysts and specific conditions of operation in regard to temperature, pressure, and time of reaction whereby diolefin hydrocarbons can be efficiently converted into aromatic hydrocarbons.

The search for catalysts to specifically control and accelerate desired conversion reactions among hydrocarbons has been attended with the usual difficulties encountered in finding catalysts for other types of reactions since there are no basic laws or rules for predicting the effectiveness of catalytic materials and the art as a whole is in a more or less empirical state. In using many catalysts even in connection with conversion reactions among pure hydrocarbons and particularly in connection with the conversion of the relatively heavy distillates and residua which are available for cracking, there is a general tendency for the decomposition reactions to proceed at a very rapid rate, necessitating the use of extremely short time factors and very accurate control of temperature and pressure to avoid too extensive decomposition. There are further difficulties encountered in maintaining the efficiency of catalysts employed in pyrolysis since there is usually a rapid deposition of carbonaceous materials on their surfaces and in their pores. The nature of the present type of catalysts is such that hydrocarbon conversion reactions are directed to the dehydrogenation and cycling of diolefinic hydrocarbons with a minimum of undesirable side reactions so that carbon formation is not pronounced and the catalysts have relatively long life.

In one specific embodiment the present invention comprises the conversion of diolefin hydrocarbons having six or more carbon atoms in straight chain arrangement into aromatic hydrocarbons by subjecting them at elevated temperatures of the order of 450–700° C. to contact for definite times of the order of 0.1–30 seconds with catalytic materials comprising major proportions of refractory carriers of relatively low catalytic activity supporting minor proportions of compounds of elements selected from those occurring in the left-hand column of Group V of the periodic table, these compounds having relatively high catalytic activity.

According to the present invention diolefin hydrocarbons having six or more carbon atoms in chain arrangements in their structure are specifically dehydrogenated in such way that the chain of carbon atoms undergoes ring closure with the production in the simplest case of benzene from such compounds as di-alkyl (1,5-hexadiene) and in the case of higher molecular weight diolefins, of various alkyl derivatives of benzene. Under properly controlled conditions of times of contact, temperature, and pressure, very high ultimate yields of the order of 60–80% of the benzene or aromatic compounds are obtainable which are considerably in excess of any previously obtained in the art either with or without catalysts. For the sake of illustrating and exemplifying the types of hydrocarbon conversion reactions which are specifically accelerated under the preferred conditions by the present types of catalysts, the following structural equations are introduced.

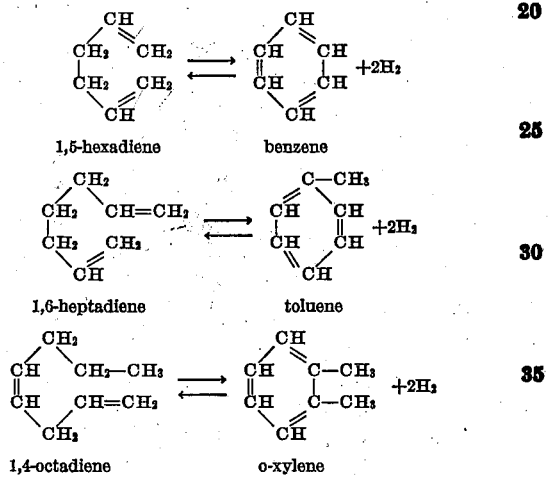

In the foregoing table the structural formulas of the primary diolefin hydrocarbons have been represented as a nearly closed ring instead of by the usual linear arrangement for the sake of indicating the possible mechanisms involved. No attempt has been made to indicate the possible existence of intermediate compounds which might result from the loss of various amounts of hydrogen. It is not known at the present time whether ring closure occurs at the loss of one hydrogen molecule or whether dehydrogenation of the chain carbons occurs so that the first ring compound formed is an aromatic such as benzene or one of its derivatives.

It will be seen from the foregoing that the scope of the present invention is preferably limited to the treatment of diolefin hydrocarbons which contain at least 6 carbon atoms in straight chain arrangement. In the case of diolefin hydrocarbons containing less than 6 carbon atoms in linear arrangement, some formation of aromatics may take place due to primary isomerization reactions although obviously the extent of these will vary considerably with the type of compound and the conditions of operation. The process is readily applicable to diolefins from hexadienes up to dodecadienes. With increase in molecular weight beyond this point the percentage of undesirable side reactions tends to increase and yields of the desired alkylated aromatics decrease in proportion.

The present invention is characterized by the use of a particular group of composite catalytic materials which employ as their base catalysts certain refractory oxides and silicates which in themselves may have some slight specific catalytic ability in the dehydrogenation and cyclization reactions but which are improved greatly in this respect by the addition of certain promoters or secondary catalysts in minor proportions. These base supporting materials are preferably of a rugged and refractory character capable of withstanding the severe use to which the catalysts are put in regard to temperature during service and in regeneration by means of air or other oxidizing gas mixtures after they have become fouled with carbonaceous deposits after a period of service. As examples of materials which may be employed in granular form as supports for the preferred catalytic substances may be mentioned the following:

Magnesium oxide      Montmorillonite clays
Aluminum oxide       Kieselguhr
Bauxite              Crushed firebrick
Bentonite clays      Crushed silica
    Glauconite (greensand)

It should be emphasized that in the field of catalysts there have been very few rules evolved which will enable the prediction of what materials will catalyze a given reaction. Most of the catalytic work has been done on a purely empirical basis, even though at times certain groups of elements or compounds have been found to be more or less equivalent in accelerating certain types of reactions.

In regard to the base catalytic materials which are preferably employed according to the present invention, some precautions are necessary to insure that they possess proper physical and chemical characteristics before they are impregnated with the promoters to render them more efficient. In regard to magnesium oxide, which may be alternatively employed, this is most conveniently prepared by the calcination of the mineral magnesite which is most commonly encountered in a massive or earthy variety and rarely in crystal form, the crystals being usually rhombohedral. The mineral is of quite common occurrence and readily obtainable in quantity at a reasonable figure. The pure compound begins to decompose to form the oxide at a temperature of 350° C., though the rate of decomposition only reaches a practical value at considerably higher temperatures, usually of the order of 800° C. to 900° C. Magnesite is related to dolomite, the mixed carbonate of calcium and magnesium, which latter mineral, however, is not of as good service as the relatively pure magnesite in the present instance. Magnesium carbonate prepared by precipitation or other chemical methods may be used alternatively in place of the natural mineral. It is not necessary that the magnesite be completely converted to oxide but as a rule it is preferable that the conversion be at least over 90%, that is, so that there is less than 10% of the carbonate remaining in the ignited materials.

Aluminum oxide which is generally preferable as a base material for the manufacture of catalysts for the process may be obtained from natural aluminum oxide minerals or ores such as bauxite or carbonates such as dawsonite by proper calcination, or it may be prepared by precipitation of aluminum hydrate from solutions of aluminum sulfate, nitrate, chloride, or different other salts, such as alums, and dehydration of the precipitate of aluminum hydroxide by heat. Usually it is desirable and advantageous to further treat it with air or other gases, or by other means to activate it prior to use.

Three hydrated oxides of aluminum occur in nature, to wit, hydrargillite or gibbsite having the formula $Al_2O_3.3H_2O$, bauxite having the formula $Al_2O_3.2H_2O$, and diaspore having the formula $Al_2O_3.H_2O$. Of these three minerals the corresponding oxides from the trihydrated and dihydrated minerals are suitable for the manufacture of the present type of catalysts and these materials have furnished types of activated alumina which are entirely satisfactory as supports for the preferred catalysts. Precipitated trihydrates can also be dehydrated at moderately elevated temperatures to form satisfactory alumina supports. The mineral dawsonite having the formula $Na_3Al(CO_3)_3.2Al(OH)_3$ is another mineral which may be used as a source of aluminum oxide, the calcination of this mineral giving an alkalized aluminum oxide which is apparently more effective as a support in that the catalyst is more easily regenerated after a period of service. Alumina in the form of powdered corundum is not suitable as a base.

It is best practice in the final steps of preparing aluminum oxide as a base catalyst to ignite the hydrated oxides for some time at temperatures within the approximate range of 600–750° C., which probably does not correspond to complete dehydration of the hydroxides but apparently gives a catalytic material of good strength and porosity so that it is able to resist for a long period of time the deteriorating effects of the service and regeneration periods to which it is subjected. In the case of the clays which may serve as base catalytic materials for supporting promoters, the better materials are those which have been acid treated to render them more siliceous. These may be pelleted or formed in any manner before or after the addition of the promoter catalyst since ordinarily they have a high percentage of fines. The addition of certain of the promoters, however, exerts a binding influence so that the formed materials may be employed without fear of structural deterioration in service.

Our investigations have also definitely demonstrated that the catalytic efficiency of such substances as alumina, magnesium oxide, and clays which may have some catalytic potency in themselves is greatly improved by the presence of compounds of the preferred elements in relatively minor amounts, usually of the order of less than 10% by weight of the carrier. It is most common practice to utilize catalysts comprising 2 to 5% by weight of these compounds, particularly their lower oxides.

The promoters which are used in accordance with the present invention to produce active catalysts of the base materials include generally compounds and more particularly oxides of the elements in the lefthand column of Group V of the periodic table including vanadium, columbium, and tantalum. In general, practically all of the compounds of the preferred elements will have some catalytic activity though as a rule the oxides and particularly the lower oxides are the best catalysts. Catalyst composites may be prepared by utilizing the soluble compounds of the elements in aqueous solutions, from which they are absorbed by prepared granular catalysts or from which they are deposited upon the carriers by evaporation of the solvent. The invention further comprises the use of catalyst composites made by mixing relatively insoluble compounds with carriers either in the wet or the dry condition. In the following paragraphs some of the compounds of the elements listed above are given which are soluble in water and which may be used to add catalytic material to carriers. The known oxides of these elements are also listed.

Vanadium

Catalysts comprising 2 to 5 per cent by weight of the lower oxides of vanadium such as the sesquioxide $V_2O_3$ and the tetroxide $V_2O_4$ may be used. Some of the monoxide VO may be present in some instances. The oxides mentioned are particularly efficient as catalysts for the present types of reactions but the invention is not limited to their use but may employ other compounds of vanadium. Thus solutions of the ammonium and the alkali metal vanadates may be employed to add vanadium compounds to the carriers and also the soluble vanadyl sulfates and the vanadium nitrate and carbonate. The alkaline earth vanadates may be mixed mechanically and also the halides of vanadium. The oxides per se or those produced by reduction or decomposition of other vanadium compounds are preferred.

Columbium

A properly prepared carrier may be ground and sized to produce granules of relatively small mesh of the approximate order of from 4 to 20 and these caused to absorb compounds which will ultimately yield compounds of columbium on heating to a proper temperature by stirring them with warm aqueous solutions of soluble columbium compounds, such as for example the mixed fluoride of columbium and potassium already mentioned having the formula $CbOF_2.2KF.H_2O$, which is sufficiently soluble in water to render it utilizable as a source of columbium catalyst. Other soluble compounds which may be used to form catalytic deposits containing columbium are the various alkali metal or tetra-alkyl-ammonium columbates. Still other compounds of columbic acids, including salts of the alkaline earth and heavy metals, may be distributed upon the carriers by mechanical mixing either in the wet or the dry condition. As a rule the lower oxides are the best catalysts. The oxide resulting from the decomposition of such compounds as the pentahydroxide is for the most part the pentoxide $Cb_2O_5$. This oxide, however, is reduced to a definite extent by hydrogen or by the gases and vaporous products resulting from the decomposition of the paraffins treated in the first stages of the process, so that the essential catalysts for the larger portion of the period of service are evidently the lower oxides $CbO_2$, $Cb_2O_3$, and $CbO$.

Tantalum

Compounds of tantalum, such as for example, the pentoxide $Ta_2O_5$ and the tetroxide $Ta_2O_4$, and possibly the sesquioxide $Ta_2O_3$, which result from the reduction of the pentoxide are particularly efficient as catalysts for the present types of reactions but the invention is not limited to their use but may employ any of the catalytically active compounds of tantalum. Tantalum fluoride and the double fluoride of tantalum and potassium having the formula $TaK_2F_7$ are soluble in water and may be conveniently used in aqueous solution as ultimate sources of the oxides which result from the ignition of the precipitated hydroxide to form the pentoxide and the partial reduction of this oxide by hydrogen or the gases and vapors in contact with the catalyst in the normal operation of the process. The tantalum pentahydroxide may be precipitated from a solution of the double fluoride by the use of ammonium or alkali metal hydroxides or carbonates as precipitants, the hydrate being later ignited to form the pentoxide, which may undergo some reduction as already stated.

The most general method for adding promoting materials to the preferred base catalysts, which if properly prepared have a high adsorptive capacity, is to stir the prepared granules of from approximately 4 to 20 mesh into solutions of salts which will yield the desired promoting compounds on ignition under suitable conditions. In some instances the granules may be merely stirred in slightly warm solutions of salts until the dissolved compounds have been retained on the particles by absorption or occlusion, after which the particles are separated from the excess solvent by settling or filtration, washed with water to remove excess solution, and then ignited to produce the desired residual promoter. In cases of certain compounds of relatively low solubility it may be necessary to add the solution in successive portions to the adsorbent base catalyst with intermediate heating to drive off solvent in order to get the required quantity of promoter deposited on the surface of and in the pores of the base catalyst. The temperatures used for drying and calcining after the addition of the promoters from solutions will depend entirely upon the individual characteristics of the compound added and no general ranges of temperature can be given for this step.

In some instances promoters may be deposited from solution by the addition of precipitants which cause the deposition of precipitates upon the catalyst granules. As a rule methods of mechanical mixing are not preferable, though in some instances in the case of hydrated or readily fusible compounds these may be mixed with the proper proportions of base catalysts and uniformly distributed during the condition of fusing or fluxing.

In regard to the relative proportions of base catalyst and promoting materials it may be stated in general that the latter are generally less than 10% by weight of the total composites. The effect upon the catalytic activity of the base catalysts caused by varying the percentage of any given compound or mixture of compounds deposited thereon is not a matter for exact calculation but more one for determination by experiment. Frequently good increases in catalytic effectiveness are obtainable by the deposition of as low as 1% or 2% of a promoting compound upon the surface and in the pores of the base catalyst, though the general average is about 5%.

It has been found essential to the production of high yields of aromatics from diolefinic hydrocarbons when using the preferred types of catalysts that depending upon the diolefin hydrocarbon or mixture of hydrocarbons being treated, temperatures from 450–700° C. should be employed, contact times of approximately 0.1 to 30 seconds and pressures approximating atmospheric. The times of contact most commonly employed with diolefinic hydrocarbons having from 6 to 12 carbon atoms to the molecule are of the order of 10 to 20 seconds. It will be appreciated by those familiar with the art of hydrocarbon conversion in the presence of catalysts that the factors of temperature, pressure, and time will frequently have to be adjusted from the results of preliminary experiments to produce the best results in any given instance. The criterion of the yield of an aromatic having the same number of carbon atoms in the ring as the original diolefin hydrocarbon charged had in the chain will serve to fix the best conditions of operation. In a general sense the relations between time, temperature, and pressure are preferably adjusted so that rather intensive conditions are employed of sufficient severity to insure a maximum amount of the desired cyclization reactions with a minimum of undesirable side reactions.

In operating the process the general procedure is to vaporize hydrocarbons or mixtures of hydrocarbons and after heating the vapors to a suitable temperature within the ranges previously specified, to pass them through stationary masses of granular catalytic material in vertical cylindrical treating columns or banks of catalyst-containing tubes in parallel connection. Since the reactions are endothermic it may be necessary to apply some heat externally to maintain the best reaction temperature. After passing through the catalytic zone the products are submitted to fractionation to recover cuts or fractions containing the desired aromatic product with the separation of fixed gases, unconverted hydrocarbons and heavier residual materials, which may be disposed of in any suitable manner depending upon their composition. The overall yield of aromatics may be increased by recycling the unconverted diolefin hydrocarbons to further treatment along with fresh material, although this is a more or less obvious expedient and not specifically characteristic of the present invention.

The present types of catalysts owing to their more or less specific action under the limited conditions of operation specified maintain their activity over relatively long periods of time. However, when their activity begins to diminish after a period of service, it is readily regenerated by the simple expedient of oxidizing with air or other oxidizing gas at a moderately elevated temperature, usually within the range employed in the dehydrogenation and cyclization reactions. This oxidation effectively removes traces of carbon deposits which contaminate the surface of the particles and decrease their efficiency. It is characteristic of the present types of catalysts that they may be repeatedly regenerated with only a very gradual loss of catalytic efficiency.

During oxidation with air or other oxidizing gas mixture in regenerating partly spent material, there is evidence to indicate that when the lower oxides are employed, they are to a large extent, if not completely, oxidized to higher oxides which combine with basic carriers to form compounds of variable composition. Later these compounds are decomposed by contact with reducing gases in the first stages of service to reform the lower oxides and regenerate the real catalyst and hence the catalytic activity.

Example I

Catalyst was prepared by dissolving 15.4 parts by weight of ammonium metavanadate in 200 parts by weight of hot water and adding the solution in two equal successive portions to 250 parts by weight of a 10–12 mesh activated alumina. After the addition of the first half of the solution the particles were somewhat damp and were dried at a steam temperature to remove excess water. After the heating the second half of the solution was added and the dehydration repeated. During the heating period ammonia and water were evolved leaving vanadium pentoxide deposited on the alumina particles.

The final steps in the preparation of the catalyst comprised heating at 200–250° C. for several hours adding the particles to a catalyst chamber in which they were brought up to the necessary reaction temperature in a current of air, and then subjecting them to the action of hydrogen at the operating temperature to produce the lower oxides, this change being accompanied by change in color from yellow to bluish gray.

The yield of pure benzene from 1,5-hexadiene when using a temperature of 515° C., substantially atmospheric pressure and a time of contact of 18 seconds was approximately 24% by weight of the 1,5-hexadiene charged as a result of the single passage over the catalyst. By proper fractionation of the products and recycling of the unconverted material, the ultimate yield of benzene was finally brought up to approximately 60%.

Example II

Di-isobutenyl was treated with the same type of catalyst as in Example I at a temperature of 585° C., substantially atmospheric pressure and 5 seconds contact time. The yield of xylenes on a once-through basis was found to be 25% by weight and again it was found that by recycling the unconverted di-isobutenyl the yield of the desired xylenes could be ultimately brought to 76%.

Example III

The general procedure in the manufacture of the catalyst was to dissolve the mixed fluoride of potassium and columbium in water and utilize this solution as a means of adding columbium compounds to a carrier. A saturated solution of this salt was made up in about 50 parts of water and this solution was then added to about 250 parts by weight of activated alumina which had been produced by calcining bauxite at a temperature of about 700° C. followed by grinding and sizing to produce particles of approximately 8–12 mesh. Using the proportions stated the alumina exactly absorbed the solution and the particles were first dried at 100° C. for about 2 hours and the temperature was then raised to 350° C. in a period of 8 hours. After this calcining treatment the particles were placed in a reaction chamber and the residual compounds heated in a current of hydrogen at about 500° C., when they were then ready for service.

1,5-hexadiene was vaporized and passed over the granular catalyst, using a temperature of 510° C., substantially atmospheric pressure, and a time of contact of 16 seconds. The yield of pure benzene under these conditions was found to be 25% by weight of the 1,5-hexadiene charged. By recycling of the unconverted material the ultimate yield was raised to 59%.

*Example IV*

Owing to the relative insolubility of most of the compounds of tantalum the method of dry mechanical mixing was resorted to in making up a catalyst. Thus one part by weight of tantalum dioxide was mixed with about 10 parts by weight of activated alumina which had been produced by calcining bauxite at a temperature of about 700° C., followed by grinding and sizing to produce particles of approximately 8–12 mesh. The catalyst particles were not treated with hydrogen on account of the known difficulty in reducing tantalum oxide although some reduction evidently took place when the hydrocarbon gas was passed over the mass in the first stages of the treatment.

The 1,5-hexadiene was vaporized and passed over a granular catalyst comprising an alumina base supporting about 4% by weight of tantalum sesquioxide, using a temperature of 515° C., substantially atmospheric pressure, and a time of contact of 20 seconds. The yield of pure benzene under these conditions was found to be 16% by weight of the 1,5-hexadiene charged. By recycling of the unconverted material the ultimate yield was raised to 57%.

We claim as our invention:

1. A process for the production of aromatic hydrocarbons from diolefin hydrocarbons having at least 6 carbon atoms in straight-chain arrangement, which comprises dehydrogenating and cyclicizing the diolefin hydrocarbon by subjection to a temperature of the order of 450 to 700° C. for a period of about 0.1 to 30 seconds in the presence of a compound of a metal from the lefthand column of Group V of the periodic table and selected from the class consisting of vanadium, columbium and tantalum.

2. A process for the production of aromatic hydrocarbons from diolefin hydrocarbons having at least 6 carbon atoms in straight-chain arrangement, which comprises dehydrogenating and cyclicizing the diolefin hydrocarbon by subjection to a temperature of the order of 450 to 700° C. for a period of about 0.1 to 30 seconds in the presence of an oxide of a metal from the lefthand column of Group V of the periodic table and selected from the class consisting of vanadium, columbium and tantalum.

3. A process for the production of aromatic hydrocarbons from diolefin hydrocarbons having at least 6 carbon atoms in straight-chain arrangement, which comprises dehydrogenating and cyclicizing the diolefin hydrocarbon by subjection to a temperature of the order of 450 to 700° C. for a period of about 0.1 to 30 seconds in the presence of a solid granular catalyst comprising a major proportion of a carrier of relatively low catalytic activity supporting a minor proportion of a compound of a metal from the lefthand column of Group V of the periodic table and selected from the class consisting of vanadium, columbium and tantalum.

4. A process for the production of aromatic hydrocarbons from diolefin hydrocarbons having at least 6 carbon atoms in straight-chain arrangement, which comprises dehydrogenating and cyclicizing the diolefin hydrocarbon by subjection to a temperature of the order of 450 to 700° C. for a period of about 0.1 to 30 seconds in the presence of a solid granular catalyst comprising a major proportion of a carrier of relatively low catalytic activity supporting a minor proportion of an oxide of a metal from the lefthand column of Group V of the periodic table and selected from the class consisting of vanadium, columbium and tantalum.

5. A process for the production of aromatic hydrocarbons from diolefin hydrocarbons having at least 6 carbon atoms in straight-chain arrangement, which comprises dehydrogenating and cyclicizing the diolefin hydrocarbon by subjection to a temperature of the order of 450 to 700° C. for a period of about 0.1 to 30 seconds in the presence of aluminum oxide supporting a relatively small amount of a compound of a metal from the lefthand column of Group V of the periodic table and selected from the class consisting of vanadium, columbium and tantalum.

6. A process for the production of aromatic hydrocarbons from diolefin hydrocarbons having at least 6 carbon atoms in straight chain arrangement, which comprises dehydrogenating and cyclicizing the diolefin hydrocarbon by subjection to a temperature of the order of 450 to 700° C. for a period of about 0.1 to 30 seconds in the presence of aluminum oxide supporting a relatively small amount of an oxide of a metal from the lefthand column of Group V of the periodic table and selected from the class consisting of vanadium, columbium and tantalum.

ARISTID V. GROSSE.
WILLIAM J. MATTOX.